US011521286B2

(12) United States Patent
Li et al.

(10) Patent No.: US 11,521,286 B2
(45) Date of Patent: Dec. 6, 2022

(54) DATA PROCESSING METHOD, APPARATUS, AND SYSTEM

(71) Applicant: SUZHOU TEKNECT ENGINEERING CO., LTD., Jiangsu (CN)

(72) Inventors: Heng Li, Suzhou (CN); Chuangyu Zhu, Suzhou (CN)

(73) Assignee: SUZHOU TEKNECT ENGINEERING CO., LTD., Jiangsu (CN)

( * ) Notice: Subject to any disclaimer, the term of this patent is extended or adjusted under 35 U.S.C. 154(b) by 480 days.

(21) Appl. No.: 16/614,281

(22) PCT Filed: Aug. 18, 2017

(86) PCT No.: PCT/CN2017/097983
§ 371 (c)(1),
(2) Date: Nov. 15, 2019

(87) PCT Pub. No.: WO2018/209831
PCT Pub. Date: Nov. 22, 2018

(65) Prior Publication Data
US 2021/0158466 A1  May 27, 2021

(30) Foreign Application Priority Data

May 19, 2017  (CN) .......................... 201710357275.4

(51) Int. Cl.
*G06F 7/00* (2006.01)
*G06Q 50/28* (2012.01)
(Continued)

(52) U.S. Cl.
CPC .......... *G06Q 50/28* (2013.01); *B66F 9/0755* (2013.01); *G06Q 10/06393* (2013.01); *G06V 20/56* (2022.01); *G06V 20/58* (2022.01)

(58) Field of Classification Search
CPC .. G06Q 50/28; G06Q 10/06393; G06Q 10/08; G06Q 10/083; B66F 9/0755;
(Continued)

(56) References Cited

U.S. PATENT DOCUMENTS 9,811,962 B2  11/2017 Phillips et al.
9,836,907 B2  12/2017 Phillips et al.
(Continued)

FOREIGN PATENT DOCUMENTS

CN        1891307 A      1/2007
CN      101063696 A     10/2007
(Continued)

OTHER PUBLICATIONS

International Search Report (in English and Chinese) and Written Opinion of the International Searching Authority (in Chinese) issued in PCT/CN2017/097983, dated Feb. 23, 2018; ISA/CN.

(Continued)

*Primary Examiner* — Yolanda R Cumbess
(74) *Attorney, Agent, or Firm* — Harness, Dickey & Pierce, P.L.C.

(57) ABSTRACT

A data processing method, device and system are provided, to count the transportation number of times for a forklift transporting goods. Specifically, current state information of a target component (for example, a pallet fork) of a to-be-detected apparatus (for example, a forklift) is acquired. If the current state information indicates that the target component carries a transportation object, the transportation number of times for which the to-be-detected apparatus transports the transportation object is updated when it is detected that the transportation object is moved away from the target component. If the current state information indicates that the target component carries no transportation object, history state information of the target component is analyzed, and (Continued)

the transportation number of times for which the to-be-detected apparatus transports the transportation object is updated based on an analysis result.

15 Claims, 9 Drawing Sheets

(51) Int. Cl.
  *G06Q 10/06* (2012.01)
  *B66F 9/075* (2006.01)
  *G06V 20/56* (2022.01)
  *G06V 20/58* (2022.01)

(58) Field of Classification Search
  CPC ........ G06V 20/56; G06V 20/58; G06V 20/52; G06V 10/20; G06V 10/30; G06V 10/44; G01V 9/00; G06M 3/08
  USPC .......................................... 700/213–214, 228
  See application file for complete search history.

(56) References Cited

U.S. PATENT DOCUMENTS

| | | | |
|---|---|---|---|
| 9,926,138 B1* | 3/2018 | Brazeau | B25J 5/007 |
| 10,013,834 B2 | 7/2018 | Phillips et al. | |
| 10,217,307 B2 | 2/2019 | Phillips et al. | |
| 10,347,066 B2 | 7/2019 | Phillips et al. | |
| 2004/0092885 A1 | 5/2004 | Duchon et al. | |
| 2013/0096735 A1 | 4/2013 | Byford et al. | |
| 2013/0328661 A1 | 12/2013 | Phillips et al. | |
| 2013/0332323 A1 | 12/2013 | Phillips et al. | |
| 2014/0025543 A1 | 1/2014 | Phillips et al. | |
| 2014/0119873 A1 | 5/2014 | Chen et al. | |
| 2014/0279294 A1* | 9/2014 | Field-Darragh | G06Q 30/0282 705/28 |
| 2016/0078704 A1 | 3/2016 | Phillips et al. | |
| 2017/0270733 A1 | 9/2017 | Phillips et al. | |
| 2018/0025565 A1 | 1/2018 | Phillips et al. | |
| 2018/0102011 A1 | 4/2018 | Phillips et al. | |
| 2018/0108197 A1 | 4/2018 | Phillips et al. | |
| 2019/0088061 A1 | 3/2019 | Phillips et al. | |

FOREIGN PATENT DOCUMENTS

| | | |
|---|---|---|
| CN | 101109941 A | 1/2008 |
| CN | 102951401 A | 3/2013 |
| CN | 103985167 A | 8/2014 |
| CN | 104460477 A | 3/2015 |
| CN | 104487207 A | 4/2015 |
| CN | 105913579 A | 8/2016 |

OTHER PUBLICATIONS

First Chinese Office Action regarding Application No. 201710357275.4 dated Mar. 16, 2020. English translation provided by Unitalen Attorneys at Law.

* cited by examiner

DATA PROCESSING METHOD, APPARATUS, AND SYSTEM

The present application is the national phase of International Patent Application No. PCT/CN2017/097983, titled "DATA PROCESSING METHOD, APPARATUS, AND SYSTEM", filed on Aug. 18, 2017, which claims priority to Chinese Patent Application No. 201710357275.4, titled "DATA PROCESSING METHOD, APPARATUS, AND SYSTEM", filed on May 19, 2017 with the Chinese Patent Office, both of which are incorporated herein by reference in theft entireties.

FIELD

The present disclosure relates to the technical field of fleet management, and in particular to a data processing method, device and system.

BACKGROUND

Currently, as common industrial trucks, forklifts are mainly used to stevedore, stack, short-distance transportation of piece goods on pallets, which play an important role in a material flow system of an enterprise. The forklifts are mainly used as material transportation apparatus, which are widely used in various places such as stations, ports, airports, factories and warehouses.

In practice, in order to supervise the forklifts and operators in an enterprise, a fleet management system is generally used, to record an operation time period of each forklifts and a working time period of each operator, so as to obtain utilization of the forklift and working efficiency of the operator.

However, in a conventional data processing method, the number of times that an operator operates a forklift is not taken into account, resulting in an inaccurate analysis result. In the conventional technology, the number of times that the forklift transports goods or pallets is calculated based on a change of hydraulic pressure. However, with this method, it is required to refit the hydraulic pressure pipeline of the forklift, which is troublesome and probably result in safety hazards such as a hydraulic leak.

SUMMARY

In view of this, a data processing method, device and system are provided in the present disclosure, to solve a technical problem in the conventional technology that a hydraulic pressure is measured complicatedly, and safety hazards such as a hydraulic leak may be caused due to inappropriate refit of a hydraulic pressure pipeline.

In order to solve the above technical problems, the following technical solutions are provided in the present disclosure.

A data processing method is provided, which includes: acquiring a current state of a target component of a transportation apparatus; and determining whether the current state indicates that the target component is carrying a transportation object; if the current state indicates that the target component is carrying a transportation object, continuously detecting whether the transportation object is no longer carried by the target component; and updating a number of times that the transportation apparatus performs transport when the transportation object is detected as being no longer carried by the target component; and if the current state indicates that the target component is not carrying a transportation object, acquiring history information of the target component; and updating, based on an analysis of the history information, the number of times that the transportation apparatus performs transport.

In some embodiments, if the current state indicates that the target component is carrying a transportation object, the method further includes: detecting movement information of the target component; determining, based on the movement information, whether the target component carrying the transportation object is operating in a first transportation phase; performing, if it is determined that the target component carrying the transportation object is operating in the first transportation phase, the process of continuously detecting whether the transportation object is no longer carried by the target component and updating a number of times that the transportation apparatus performs transport when the transportation object is detected as being no longer carried by the target component; and returning to the process of detecting the movement information of the target component if it is determined that the target component carrying the transportation object is not operating in the first transportation phase.

In some embodiments, the updating, based on an analysis of the history information, the number of times that the transportation apparatus performs transport includes: determining, based on the analysis of the history information, whether the target component carried a transportation object in an adjacent time period; and updating the number of times that the transportation apparatus performs transport if the target component carried an transportation object in the adjacent time period.

In some embodiments, if the current state indicates that the target component is carrying a transportation object, the method further includes: calculating a time difference between a time that the target component is currently carrying the transportation object and a time that the target component previously carried another transportation object. The updating a number of times that the transportation apparatus performs transport when detecting that the transportation object is no longer carried by the target component includes: updating the number of times that the transportation apparatus performs transport when detecting that the transportation object is no longer carried by the target component, if the time difference is greater than a time threshold.

In some embodiments, the acquiring a current state of a target component of a transportation apparatus includes: acquiring image information of the target component of the transportation apparatus by an image collector; and determining the current state of the target component based on an analysis of the image information. The continuously detecting whether the transportation object is no longer carried by the target component includes: continuously detecting whether the transportation object is no longer carried by the target component based on an analysis of other frames of the image information.

In some embodiments, the acquiring a current state of a target component of a transportation apparatus includes: acquiring a detection signal from an obstacle sensor, when detecting that the target component of the transportation apparatus is located at a predetermined position by a position sensor; and determining whether the target component is carrying a the transportation object based on a frame of the detection signal. The continuously detecting whether the transportation object is no longer carried by the target component includes: continuously detecting whether the transportation object is no longer carried by the target component based on other frames of the detection signal from the obstacle sensor.

In some embodiments, the method further includes: determining whether the target component reaches a predetermined position by a position sensor; and if it is determined that the target component reaches the predetermined position, outputting a prompt message to prompt an operator to input a command for controlling the target component to move in reverse, or controlling the target component to move in reverse.

In some embodiments, the updating the number of times that the transportation apparatus performs transport includes: receiving authentication information of an operator currently operating the transportation apparatus; acquiring a first number of times that is stored in association with the authentication information, wherein the first number of times is a number of times that the operator performs transport, and acquiring a second number of times that is stored in association with the transportation apparatus, wherein the second number of times is a number of times that the transportation apparatus performs transport; and updating the first number of times and the second number of times.

In some embodiments, if the current state indicates that the target component is carrying a transportation object, the method further includes: a time period that the transportation apparatus has transported the transportation object from picking up the transportation object until unloading the transportation object from the target component, to obtain a total transportation time period for the transportation apparatus; and transmitting the updated number of times that the transportation apparatus performs transport and the total transportation time period to a server.

A data processing device is further provided, which includes an information collector, a memory and a controller. The information collector is configured to collect current state of a target component of a transportation apparatus. The memory is configured to store history information of the target component and the number of times that the transportation apparatus transports a transportation object. The controller is configured to: acquire the current state; and determine whether the current state indicates that the target component is carrying a transportation object; if the current state indicates that the target component is carrying a transportation object, continuously detect whether the transportation object is no longer carried by the target component, and updating a number of times that the transportation apparatus performs transport when the transportation object is detected as being no longer carried by the target component; and if the current state indicates that the target component is not carrying a transportation object, acquiring the history information of the target component, and update, based on an analysis of the history information, the number of times that the transportation apparatus performs transport.

In some embodiments, the device further includes a movement detector. The movement detector is configured to detect movement information of the target component. If the current state indicates that the target component is carrying a transportation object, the controller is further configured to determine, based on the movement information, whether the target component is operating in a first transportation phase; and if the target component is operating in a first transportation phase, continuously detect whether the transportation object is no longer carried by the target component and update a number of times that the transportation apparatus performs transport when the transportation object is detected as being no longer carried by the target component.

In some embodiments, the controller is further configured to: determine, based on an analysis of the history information, whether the target component carried the transportation object in an adjacent time period; and update the number of times that the transportation apparatus performs transport if the target component carried the transportation object in the adjacent time period.

In some embodiments, the information collector is an image collector. The target component is arranged on the transportation apparatus and is located within a photographing range of the image collector. The image collector is configured to collect image information of the target component of the transportation apparatus in real time. The controller is further configured to: acquire the current state of the target component based on an analysis of a frame of the image information; and continuously detect whether that the transportation object is no longer carried by the target component based on an analysis of other frames of the image information.

In some embodiments, the information collector includes an obstacle sensor and a position sensor. The position sensor is configured to detect whether the target component of the transportation apparatus is located at a predetermined position. The obstacle sensor is configured to transmit a first signal to the target component, receive a second signal fed back from the target component, and generate a detection signal for the target component. The controller is further configured to: determine whether the target component is carrying a transportation object based on a frame of the detection signal; and continuously detect whether the transportation object is no longer carried by the target component based on other frames of the detection signal from the obstacle sensor.

A data processing system is further provided, which includes a terminal, a server and the above described data processing device. The data processing device is configured to transmit a total number of times that the transportation apparatus performs transport and information of an operation time period of the transportation apparatus to the server. The operation time period includes a transportation time period, a standby time period and a shutdown time period of the transportation apparatus that is associated with each user account. The server is configured to generate an operation report based on the total number of times that the transportation apparatus performs transport and the information of the operation time period. The terminal is configured to display the operation report.

It can be seen that, compared with the conventional technology, a data processing method, device and system are provided according to the present disclosure, to count the number of times that a forklift transports goods. Specifically, a current state of a target component (for example, a pallet fork) of a transportation apparatus (for example, a forklift) is acquired. If the current state indicates that the target component is carrying a transportation object, the number of times that the transportation apparatus performs transport is updated when detecting that the transportation object is no longer carried by the target component. If the current state indicates that the target component is not carrying a transportation object, history information of the target component is analyzed, and the number of times that the transportation apparatus performs transport is updated based on an analysis result. It can be seen that, in the present disclosure, the number of times that the transportation apparatus transports goods is counted simply without having to refit a hydraulic pressure pipeline, thereby ensuring security in using the transportation apparatus.

BRIEF DESCRIPTION OF THE DRAWINGS

In order to more clearly illustrate technical solutions in embodiments of the present disclosure or in the conventional technology, drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some, rather than all of the embodiments of the present disclosure. All other embodiments obtained by those skilled in the art based on the embodiments of the present disclosure without any creative work fall within the protection scope of the present disclosure.

A data processing method, device and system are provided according to the present disclosure, to count the number of times that a forklift transports goods. Specifically, a current state of a target component (for example, a pallet fork) of a transportation apparatus (for example, a forklift) is acquired. If the current state indicates that the target component is carrying a transportation object, the number of times that the transportation apparatus performs transport is updated when detecting that the transportation object is no longer carried by the target component. If the current state indicates that the target component is not carrying a transportation object, history information of the target component is analyzed, and the number of times that the transportation apparatus performs transport is updated based on an analysis result. It can be seen that, in the present disclosure, the number of times that the transportation apparatus transports goods is counted simply without having to refit a hydraulic pressure pipeline, thereby ensuring security in using the transportation apparatus.

In the method, the device and the system according to the present disclosure, the transportation apparatus may be a forklift, an in-plant transporting vehicle, a ladder tool car, a sweeping machine or the like, which is not limited herein.

To make the above objects, features and advantages of the present disclosure to be clear and easily understood, the present disclosure is described in detail below with reference to the drawings and the following embodiments.

Figure 1:
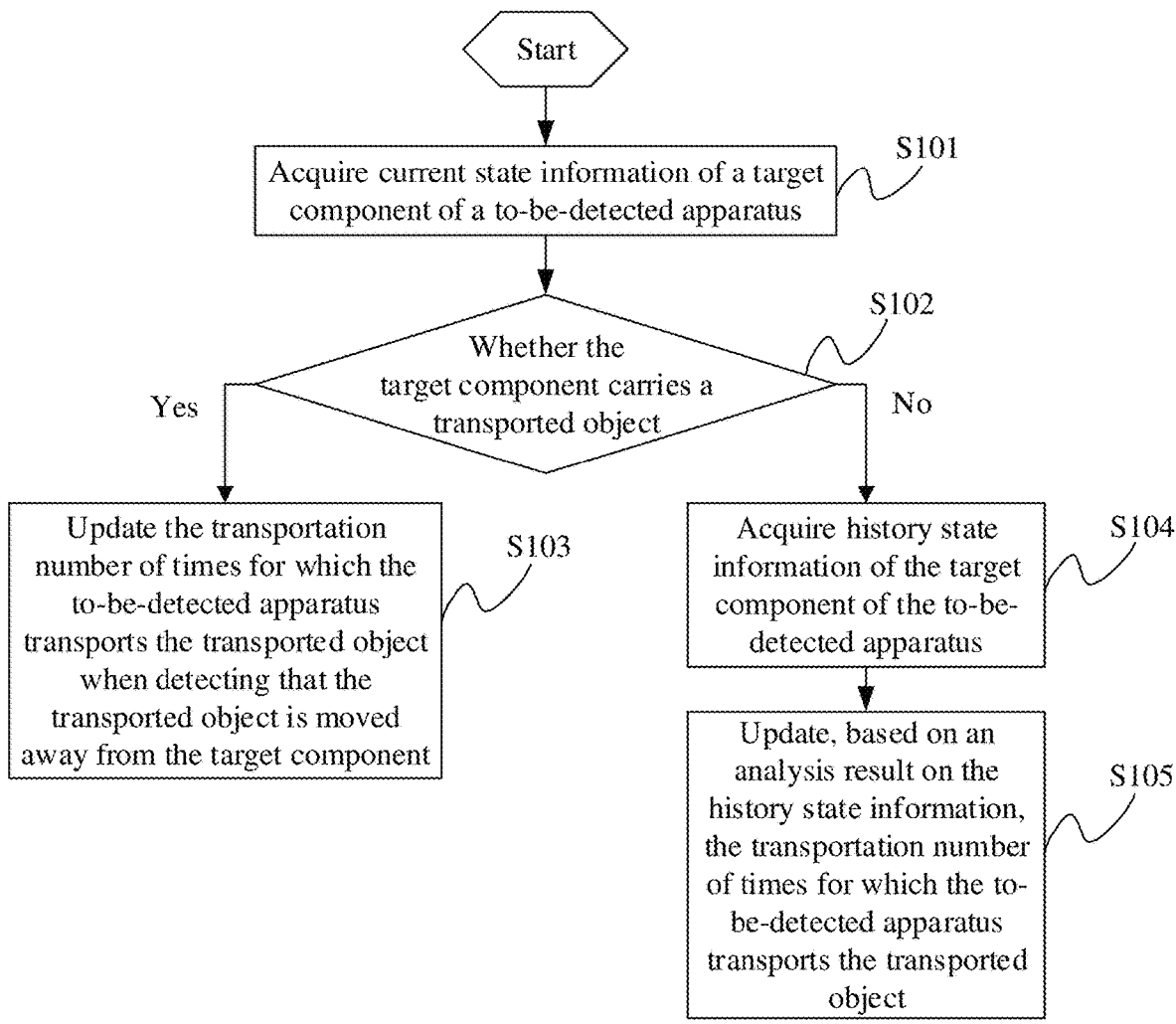
FIG. 1 is a flowchart of a data processing method according to an embodiment of the present disclosure.

Reference is made to FIG. 1, which is a flowchart of a data processing method according to an embodiment of the present disclosure. The method is applicable to a controller of a data processing device. The data processing device may be arranged in a transportation apparatus. In practice, the method may include the following steps S101 to S105.

In step S101, a current state of a target component of a transportation apparatus is acquired.

In this embodiment, description is made by using an example that the transportation apparatus is a forklift and the target component is a pallet fork of the forklift. In order to manage a forklift and operators of the forklift and obtain condition of each operator operating the forklift, in the present disclosure, operations of the operator on the transportation apparatus may be detected when the operator successfully logs in a control system of the transportation apparatus by using authentication information. In this embodiment, an operation performed by the operator on the transportation apparatus and an operation state of the transportation apparatus may be obtained by detecting movement of the pallet fork of the forklift.

It is to be noted that, different types of transportation apparatuses may have different target components, which are not limited herein.

The acquired current state indicates whether the target component is carrying a transportation object. The current state may be represented in any form, which is not limited in the present disclosure. The form of the current state depends on the type of the device that collects the information of the target component. The current state may be collected by different information collecting devices for the target component, and may be of different forms.

In an embodiment of the present disclosure, image information of the target component of the transportation apparatus may be collected by an image collector arranged in the transportation apparatus. The image collector may be arranged on the top of the transportation apparatus (for example, a top of a cab of a vehicle) or a movement mechanism of the target component, so that the image collector moves synchronously with the target component, thereby ensuring that the target component is located within a photographing range of the image collector. A position where the image collector is arranged is not limited herein.

Based on the above, after collecting the image information of the target component, the image collector may transmit, in a wired or wireless manner, the image information of the target component to a controller of the transportation apparatus in real time, so that the controller may analyze the acquired image information, to determine the current state of the target component.

In practice, during operation of the transportation apparatus, the image collector operates ceaselessly to collect the image information of the target component in real time and transmit the image information of the target component to the controller, so that the controller acquires the state information of the target component in real time. In this way, a state of the target component is detected in real time.

In another embodiment of the present disclosure, the state information of the target component may be detected with an obstacle detection technology. In this embodiment, description is made by using an example that the transportation apparatus is a forklift. An obstacle sensor may be arranged at a position such as a load-backrest, a pallet fork, a mast, an overhead guard or the like of the forklift according to actual demands, which is not limited herein.

In an embodiment, the obstacle sensor may be a distance measurement sensor, such as an infrared sensor, a laser sensor or an ultrasonic detector. The obstacle sensor transmits a first signal to the target component and the transportation object carried by the target component, receives a fed-back second signal to generate a detection signal, and transmit the detection signal to the controller. The controller analyzes the detection signal, and determines whether the target component is carrying a transportation object based on an analysis result. Data such as the number of times of roundtrips of the target component may be directly calculated as needed.

In practice, the obstacle sensor may be triggered to operate when it is determined by a position sensor (for example, a limit sensor or a switch) that the target component reaches a predetermined position (that is a position where the transportation object is carried). For example, the obstacle sensor and a mast movement limit switch may be arranged on a chassis of the forklift, and if the pallet fork falls to reach the predetermined position, the limit switch is triggered to be switched, to prevent the pallet fork from falling continually, thus preventing the pallet fork from being impacted by the ground.

It is to be noted that the predetermined position is not limited herein. The predetermined position may be determined based on a model and an operation state of the transportation apparatus, which is not described in detail herein.

In step S102, it is determined whether the current state indicates that the target component is carrying a transportation object. If the current state indicates that the target component is carrying a transportation object, the method proceeds to step S103. If the current state indicates that the target component is not carrying a transportation object, the method proceeds to step S104.

Based on the current state of the target component, the process of determining whether the target component is carrying a transportation object varies depending on the form of the acquired current state. For example, when the current state is determined by receiving image information collected by the image collector, whether the target component is carrying a transportation object is determined by analyzing the image information. For another example, the current state may also be obtained based on a detection signal from an obstacle sensor. In this case, the transportation object may be detected as an obstacle when the target component is carrying a transportation object. The output from the obstacle sensor may be analyzed to determine whether the target component is carrying a transportation object directly based on an electrical level or contents of the detection signal, which is not described in detail herein.

In step S103, the number of times that the transportation apparatus performs transport is updated, when detecting that the transportation object is no longer carried by the target component.

In the present disclosure, the target component and the transportation object carried by the target component may be continuously detected by the image collector or the obstacle sensor, to determine the movement state of the target component and determine whether the current transportation is completed, that is, to determine whether the transportation object is no longer carried by the target component. When it is detected that the transportation object is no longer carried by the target component, it may be determined that the operator completes one transportation operation. In this case, the stored number of times that the operator performs transport by operating this transportation apparatus is added by one.

Generally, a same transportation apparatus may be operated by various operators. In the present disclosure, multiple operators operating the same transportation apparatus may be distinguished from each other by using authentication information of the operators. Therefore, the number of times may be stored in association with the authentication information of each operator. For example, a correspondence between the authentication information of each operator and the number of times that the operator performs transport may be established. When the operator performs one transportation operation, the number of times corresponding to authentication information of the operator is updated. However, the number of times may be updated in any ways, which is not limited herein.

The authentication information of the operator may include an account and/or a password, pattern information, fingerprint information, pupil information, face information or the like. The controller of the transportation apparatus or a mobile terminal may verify the operator by using the authentication information, to determine whether the operator is authorized to operate the transportation apparatus.

In step S104, history information of the target component of the transportation apparatus is acquired.

The state of the target component of the transportation apparatus is detected. The current state of the target component acquired each time may be stored with the acquiring time. Therefore, when it is determined that the target component is not carrying a transportation object, the history information of the target component may be obtained to determine the target component is in which phase, among an ascending phase, a descending phase, a phase of going to ascend after transporting the transportation object to a predetermined position, and the like, so as to determine whether the target component transported a transportation object.

In this embodiment, the history information of the target component in a time period may be acquired. The time period is not limited herein, which may be determined according to actual demands or based on a current state of the target component.

In step S105, the number of times that the transportation apparatus performs transport is updated based on an analysis of the history information.

In this embodiment, it may be determined whether the target component loaded the transportation object in an adjacent time period preceding the current time by analyzing the history information of the target component. That is, if it is detected that the target component is carrying a transportation object and then it is detected that the transportation object is unloaded, the number of times that the transportation apparatus performs transport may be added by one. If it is detected that the target component did not carry a transportation object in the adjacent time period, the number of times that the transportation apparatus performs transport remains unchanged.

The number of times may be updated with reference to the description in the above embodiment, that is, the number of times may be updated based on authentication information of the operator. In addition, the number of times may be recorded respectively for transportation objects of different types. Therefore, when it is determined that one transportation operation of the transportation apparatus for transporting a transportation object is completed, a current number of times for transporting the transportation object of this type may be acquired and updated. Further, a total number of times that the transportation apparatus transports transportation objects of all types may be updated in real time. The number of times may be stored in any way according to actual management demands, which is not limited herein.

In summary, in this embodiment, by acquiring the current state of the target component of the transportation apparatus in real time, it may be timely determined whether the target component is carrying a transportation object, that is, whether the transportation apparatus performs transport at the current time. If it is determined that the target component performs transport, the number of times that the transportation apparatus performs transport is added by one when detecting that the transportation object is no longer carried by the target component. If it is determined that the target component transport no transportation object at the current time, it may be determined whether the target component has performed one transportation operation based on an analysis of the history information of the target component, so as to update the number of times for the transportation apparatus. In this way, the number of times that the transportation apparatus performs transport can be rapidly and reliably recorded without having to refit a hydraulic pressure pipeline of the transportation apparatus, thereby ensuring security in a whole process of recording the number of times.

Based on the above embodiment, an actual operation time period of the transportation apparatus and a transportation time period during which the transportation apparatus is carrying a transportation object may be recorded, to analyze operation efficiency of the transportation apparatus. If it is determined that the target component is carrying a transportation object, it is determined whether the transportation apparatus is started to transport the transportation object. If it is determined that the transportation apparatus is to transport, timing is started and a current time is recorded, and when it is detected that the transportation object is no longer carried by the target component, the timing is stopped. Then the transportation time period during which the target component of the transportation apparatus is carrying a transportation object can be calculated based on the two time points. Alternatively, timing may also be stopped when it is detected that the target component again is carrying a transportation object or the target component ascends to reach a transportation starting point after detecting that the transportation object is no longer carried by the target component. Thus a time period taken by the transportation apparatus to perform one transportation operation on the transportation object can be calculated based on the two time points. In this way, the operation efficiency of the transportation apparatus and working efficiency of the operator can be calculated based on the operation time period of the transportation apparatus.

The operation time period of the transportation apparatus may refer to a time period from a time that the transportation apparatus is started to a time that the transportation apparatus is stopped operating, which is generally longer than the transportation time period of the transportation apparatus. That is, the operation time period of the transportation apparatus includes the transportation time period during which the transportation apparatus is carrying a transportation object.

In addition, data such as the above obtained number of times that the transportation apparatus performs transport and the time period taken by the transportation apparatus to perform one transportation operation on the transportation object may be transmitted to a server via the controller or the mobile terminal, for the server to analyze the data to obtain an analysis report, and transmit the analysis report to the mobile terminal for displaying, so that a manager can timely and visually obtain the operation state of the transportation apparatus and the working condition of the operator.

It is to be noted that, the above data may be transmitted and analyzed in any ways according to actual needs, which is not limited herein. Contents of the obtained analysis report are also not limited herein.

Figure 2:
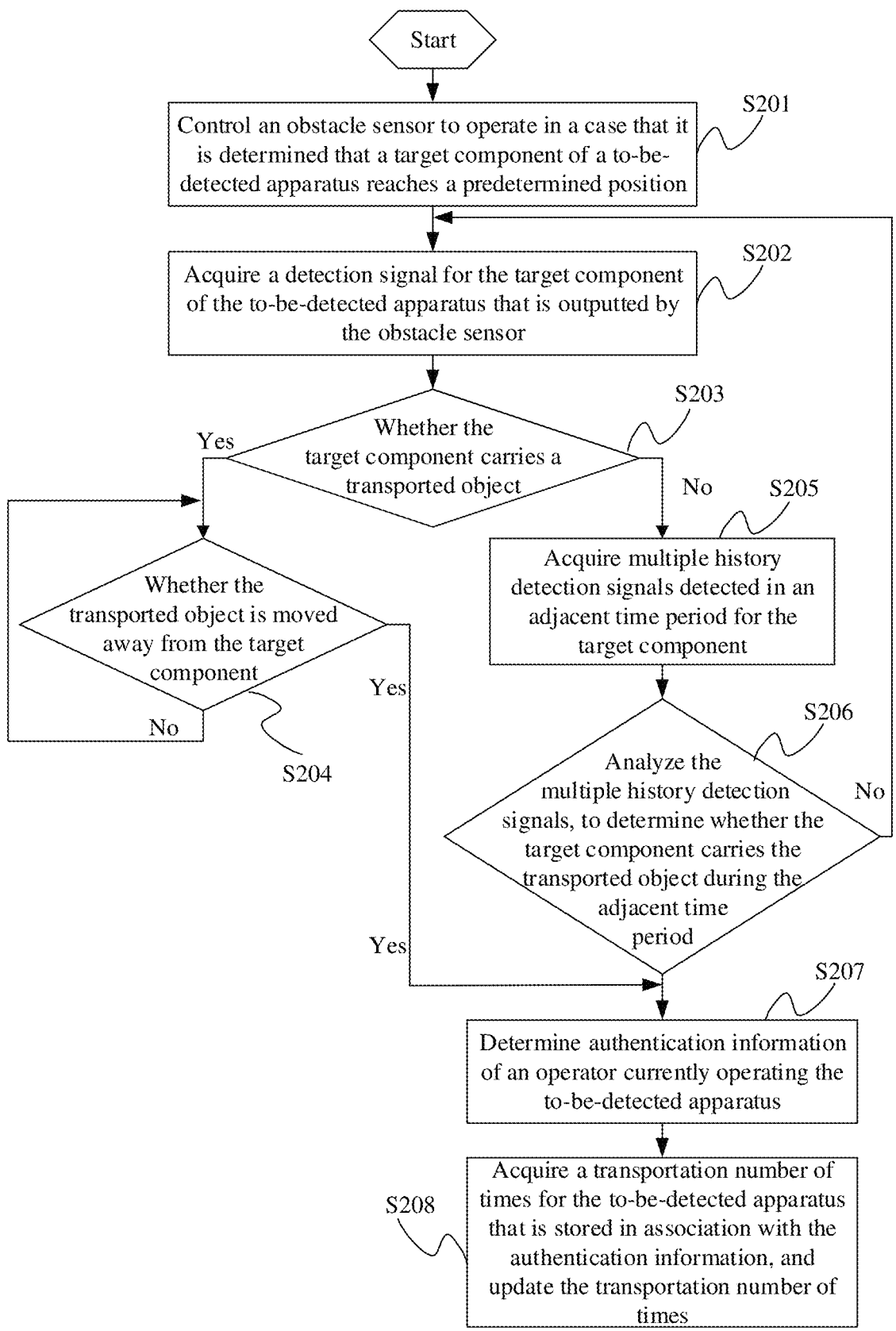
FIG. 2 is a flowchart of a data processing method according to another embodiment of the present disclosure.

Reference is made to FIG. 2, which is a flowchart of a data processing method according to another embodiment of the present disclosure. The method is described by taking an application scenario in which a forklift transports goods with a pallet fork as an example. The method may include the following steps S201 to S208.

In step S201, an obstacle sensor is controlled to operate when it is determined that a target component of a transportation apparatus reaches a predetermined position.

Based on the description in the above embodiment, in order to improve accuracy of the obstacle sensor in detecting a state of the target component and prevent the target component from striking the ground due to excessive movement, a certain movement range, that is, a movement range for the target component to carry the transportation object, may be set for the target component. When the target component reaches an upper limit position or a lower limit position of the movement range, the target component may be controlled to be stopped or move in reverse. It can be seen that, the lower limit position is generally a position where the transportation object is unloaded, and the upper limit position is generally a position where the transportation object is loaded.

Based on characteristics of the obstacle sensor, the detection signal outputted by the obstacle sensor is changed only when an obstacle, that is, the transportation object carried by the target component passes. If the obstacle sensor is triggered untimely, energy consumption is increased while no beneficial effects is caused.

Based on the above, in this embodiment, it may be detected whether the target component of the transportation apparatus reaches the predetermined position. The predetermined position may be the upper limit position or the lower limit position of a predetermined movement range of the target component, which may be determined based on factors such as an arrangement position of the obstacle sensor and a transportation destination of the transportation object. If it is determined that the target component reaches the predetermined position, the obstacle sensor operate to detect whether the target component is carrying a transportation object.

In step S202, a detection signal for the target component of the transportation apparatus is acquired from the obstacle sensor.

The detection signal may be acquired by the methods described in the above embodiments, which is not described in detail in this embodiment.

In step S203, it is determined whether the target component is carrying a transportation object based on an analysis of the detection signal. If the target component is carrying a transportation object, the method proceeds to step S204. If the target component is not carrying a transportation object, the method proceeds to step S205.

In this embodiment, based on detection characteristics of the obstacle sensor, the detection signal outputted by the obstacle sensor is changed when detecting an obstacle, so as to accurately detect the target component carrying a transportation object.

As described in the above embodiment, the obstacle sensor may be a distance measurement sensor, such as an infrared sensor, a laser sensor or an ultrasonic detector. An operation principle of the distance measurement sensor is not described in detail herein.

Figure 3:
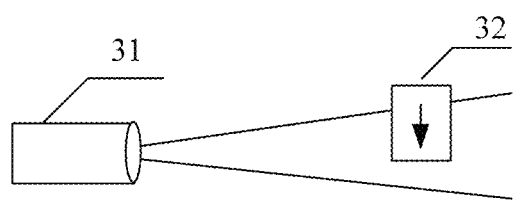
FIG. 3 is a schematic diagram showing an operation principle of an acoustic sensor according to the present disclosure.

As shown in FIG. 3, when the obstacle sensor is an acoustic detector 31, an emitting port and a detecting port of the acoustic detector need to face toward a movement track of the target component. When it is determined that a target component 32 reaches the predetermined position, the acoustic detector is controlled to output a first signal. In this case, if the target component is carrying a transportation object, the transportation object feeds back a second signal, that is, an echo signal, after receiving the first signal emitted to the transportation object. After detecting the second signal, the acoustic detector may output a corresponding detection signal, to indicate whether the target component is carrying a transportation object.

According to the acoustic principle, a transmission direction of an acoustic signal is changed once being blocked by the obstacle (that is, the transportation object), which causes that attribute information of the acoustic signal detected at the detecting port is different from attribute information of the acoustic signal emitted from the emitting port, or is different from attribute information of the acoustic signal which is detected in a case of no obstacle. In the present disclosure, it may be determined whether the target component is carrying a transportation object based on a change of the attribute information of the acoustic signal.

It is to be noted that, the arrangement position of the obstacle sensor may be reasonably determined in the above detecting process, to avoid a case that the target component or other component of the transportation apparatus is determined as the obstacle in the detecting process, which may reduce accuracy in detecting whether the target component is carrying a transportation object.

In addition, a component structure and a detection manner of the obstacle sensor are not limited to the description in the present disclosure, which may be adaptively adjusted based on the above conception.

In step S204, it is determined whether the transportation object is no longer carried by the target component based on an analysis of multiple continuously obtained detection signals. If it is determined that the transportation object is no longer carried by the target component, the method proceeds to step S207. If it is determined that the transportation object is not no longer carried by the target component, step S204 is repeated.

Based on the above description, in a case it is determined that the target component is carrying a transportation object, the target component is continuously detected. The number of times that the transportation apparatus performs transport is added by one when it is determined that the operator moves the transportation object from the target component to a target position.

The target component may be detected in the same manner as that used to detect whether the target component is carrying a transportation object, which is not limited herein. In this embodiment, the transportation object carried by the target component is detected still with the obstacle sensor. As described above, since the detection signal may directly indicate whether the target component is carrying a transportation object, in this embodiment, when the transportation object is no longer carried by the target component may be determined by analyzing the continuously obtained detection signals.

Based on this, the detection signal is continuously obtained and analyzed, to determine whether the target component is carrying a transportation object, so as to obtain a time period during which the target component is carrying the transportation object and a time that the transportation object is no longer carried by the target component, so that a time period that the transportation apparatus performs one transportation operation on the transportation object can be calculated.

Further, the time that the transportation object is no longer carried by the target component may be recorded in association with a type of the transportation object, attribute information of the transportation apparatus (such as a serial number, a model, a current operation time period of the transportation apparatus) and attribute information of a current operator (such as the number and a working time period). The time period during which the target component is carrying a transportation object and the time that the transportation object is no longer carried by the target component, and data contents associated therewith are not limited herein, which may be determined according to actual management needs and are not described in detail herein.

In step S205, multiple history detection signals during an adjacent time period are acquired for the target component.

Based on the above description in step S203, in order to avoid missing recording of the number of times that the transportation apparatus performs transport, if it is detected that the target component is not carrying a transportation object at a current time, information regarding the transportation object during the time period preceding the current time, that is, the multiple history detection signals during the adjacent time period, may be detected, to determine whether the target component carried a transportation object during the time period preceding the current time.

The determined time period preceding the current time is not limited herein, which may be determined by experiments or the like. In the present disclosure, the time period preceding the current time may be referred to as an adjacent time period.

It is to be noted that, the information used for determining whether the target component is carrying a transportation object may be continuously detected. A process is similar to the process that the target component is detected by the obstacle sensor described in this embodiment, and is not described in detail herein.

In addition, in some certain scenarios, one history detection signal may be acquired to determine whether the target component is carrying a transportation object. That is, at least one history detection signal is acquired in step S205. In this embodiment, only the case of acquiring and analyzing of the multiple history detection signals is described in this embodiment, and for one history detection signal, the process is similar to that described in this embodiment, and is not described in detail herein.

In step S206, the multiple history detection signals are analyzed, to determine whether the target component carried a transportation object in the adjacent time period. If it is determined that the target component carried a transportation object in the adjacent time period, the method proceeds to step S207. If it is determined that the target component did not carry a transportation object in the adjacent time period, the method returns to step S202.

In this embodiment, since the detection signal may indicate whether the target component is carrying a transportation object, if it is determined that the target component is not carrying a transportation object at the current time, it may be determined whether the target component carried a transportation object in the adjacent time period preceding the current time by analyzing the multiple successive history detection signals. When the target component carried a transportation object in the adjacent time period preceding the current time, it may be determined that the transportation apparatus performs one transportation operation. When the target component did not carry a transportation object in the adjacent time period preceding the current time, it may be determined that the transportation apparatus does not transport the transportation object in this movement. In this case, the number of times for the transportation apparatus performs transport remains unchanged.

It is to be noted that, the above adjacent time period is not limited herein. In order to avoid repeatedly recording the number of times, the adjacent time period is generally short, which may be, for example, a time period of obtaining adjacent two detection signals. The value of the above adjacent time period is not specifically limited herein.

In step S207, authentication information of an operator currently operating the transportation apparatus is determined.

In practice, a same transportation apparatus may generally be operated by various operators. In order to obtain working condition of each operator, data such as working time period, the number of transportation times, a type of the transportation object that are generated during an operator transporting the transportation objects may be stored in association with the authentication information of the operator, so that current working condition of the operator can be rapidly and accurately obtained based on the authentication information of the operator.

It is to be noted that, contents of the authentication information of the operator, and a manner in which the authentication information of the operator is stored in association with the various data are not limited herein, which may be determined based on the actual demands and are not described in detail herein.

In step S208, the number of times that is stored in association with the authentication information is acquired and is updated.

In this embodiment, if it is determined the transportation apparatus transports the transportation object to the target position with the target component, the number of times of transporting the transportation object is added by one, and the number of times that the operator transports the transportation object is also added by one.

The number of times of transporting the transportation object may be updated with reference to a time period that the transportation object is currently transported, to avoid repeated recording of the number of times. Further, the operation time period of the transportation apparatus, the working time period of the operator and the like may be counted based on the transportation time period, which is not described in detail herein.

In another embodiment, if it is determined that the target component carried a transportation object in the adjacent time period in step S206, in order to prevent recording the number of times repeatedly, it may be detected whether a stored transportation time period is identical to the time period that the transportation object is currently transported, before updating the number of times. If it is determined that the stored transportation time period is identical to the time period that the transportation object is currently transported, it is indicated that this transportation operation is already recorded, so that the number of times is not updated. If it is determined that the stored transportation time period is not identical to the time period that the transportation object is currently transported, the number of times is updated.

In summary, the target component of the transportation apparatus is detected with the obstacle sensor in this embodiment. If it is determined that the target component is carrying a transportation object, the number of times for the transportation object is updated when the transportation object is no longer carried. If it is determined that the target component is not carrying a transportation object at the current time, it may be determined whether the transportation object was unloaded in the adjacent time period preceding the current time based on the history information of the target component. If it is determined that the transportation object was unloaded in the adjacent time period, the number of times for the transportation object is updated, to avoid missing recording of the number of times.

Figure 4:
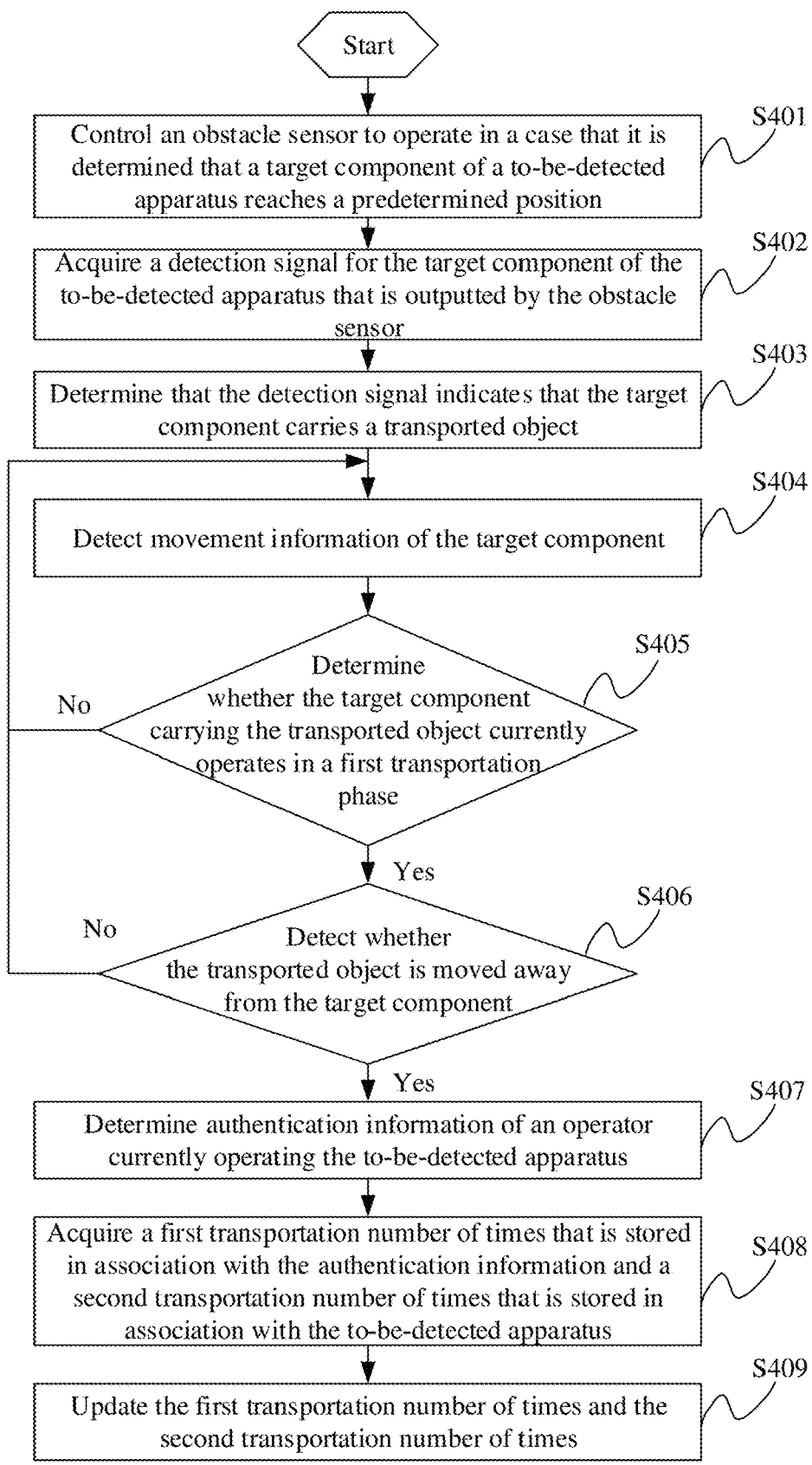
FIG. 4 is a flowchart of a data processing method according to another embodiment of the present disclosure.

Reference is made to FIG. 4, which is a flowchart of a data processing method according to another embodiment of the present disclosure. The method is described by taking a scenario in which a forklift transports goods with a pallet fork as an example, but the present disclosure is not limited thereto. In this embodiment, the method may include the following steps S401 to S409.

In step S401, the obstacle sensor is controlled to operate when determining that the target component of the transportation apparatus reaches a predetermined position.

In step S402, a detection signal for the target component of the transportation apparatus is acquired by the obstacle sensor.

In step S403, it is determined that the detection signal indicates that the target component is carrying a transportation object.

In this embodiment, a process of detecting whether the target component is carrying a transportation object may be similar to that in the above embodiment described with reference to FIG. 2, which is not described in detail herein.

In an example, if it is determined that the target component is carrying a transportation object, a first loading time is recorded. Further, a second loading time that the target component previously carried a transportation object is acquired. A time difference between the first loading time and the second loading time is calculated, and it is determined whether the time difference is greater than a time threshold. If the time difference is greater than the time threshold, the number of times is added by one when the current transportation operation on the transportation object is completed.

It can be seen that, the time threshold between a time that the target component currently is carrying a transportation object and a time that the target component previously carried a transportation object is set, to reduce erroneous determination about that the target component is carrying a transportation object due to the target component in the ascending phase or the descending phase. It is to be noted that, the time threshold is not limited herein.

In step S404, movement information of the target component is detected.

The movement information of the target component may be detected by the image collector in the present disclosure. Alternatively, the movement information of the target component may be determined by acquiring a control command transmitted by the controller to the target component. When the controller transmits a descending command to the target component, the target component performs a descending movement. The manner of acquiring the movement information of the target component is not specifically limited herein.

The movement information of the target component may represent a current movement state of the target component, which may include information of a movement direction, a movement track, a movement speed, an operation time period, and the like of the target component. Data contents included in the movement information are not limited herein.

In step S405, it is determined whether the target component carrying the transportation object currently operates in a first transportation phase based on the movement information. If it is determined that the target component carrying the transportation object currently operates in the first transportation phase, the method proceeds to step S406. If it is determined that the target component carrying the transportation object does not operate in the first transportation phase, the method returns to step S404.

Taking the scenario where the forklift transports goods with the pallet fork as an example, the first transportation phase may be a descending movement phase or an ascending movement phase, and accordingly the second transportation phase may be the ascending movement phase or the descending movement phase, which may be determined based on actual application scenarios.

For example, when the transportation object is required to be transported from a high position to a low target position, the first transportation phase is the descending movement phase and the second transportation phase is the ascending movement phase. In practice, the pallet fork operates in the descending movement phase after carrying the transported target, unloads the transportation object when reaching the target position, and then operates in the ascending movement phase to carry a transportation object again. The above procedure is repeated in this way, to complete transportation of the transportation object.

In a process of transporting the transportation object, a transportation object may be required to be transported from a low position to a high target position. In this case, the first transportation phase is the ascending movement phase, and the second transportation phase is the descending movement phase. A process of transporting the transportation object is similar to that described in the above, and is not described in detail herein. It can be seen that, the first transportation phase is a movement phase in which the transportation object is transported to the target position, which is not limited to the ascending movement phase or the descending movement phase.

In this embodiment, it can be accurately determined whether the target component is transporting the transportation object to the target position by analyzing the continuously acquired movement information of the target component. If it is determined that the target component is transporting the transportation object to the target position, the time that the transportation object is unloaded is detected. If it is determined that the target component is not transporting the transportation object to the target position, it may indicate that an operator or an object may pass by the target component, rather than being transported by the target component. In this case, even if the obstacle sensor detects that there is the obstacle and then the obstacle is unloaded, the number of times of transporting the transportation object is not added by one, so that the accuracy in counting the number of times that the transportation apparatus performs transport can be ensured.

In step S406, it is detected whether the transportation object is no longer carried by the target component based on the acquired detection signal. If it is detected that the transportation object is no longer carried by the target component, the method proceeds to step S407, otherwise the method returns to step S404.

In step S407, authentication information of an operator currently operating the transportation apparatus is determined.

In step S408, a first number of times that is stored in association with the authentication information and a second number of times that is stored in association with the transportation apparatus are acquired.

In this embodiment, the first number of times may be the number of times that the operator currently operating the transportation apparatus performs transport. Specifically, the first number of times may be a total number of times that the operator transports various types of transportation objects with various transportation apparatuses. Alternatively, the first number of times may be a total number of times that the operator transports various types of transportation objects with this transportation apparatus, or the number of times that the operator transports this type of transportation objects with this transportation apparatus or the like. Contents indicated by the first number of times are not limited herein.

Similarly, the second number of times may be a total number of times that different operators transports various types of transportation objects with this transportation apparatus, or the number of times that different operators transports this type of transportation objects with this transportation apparatus, or the like.

In step S409, the first number of times and the second number of times are updated.

In practice, the updated first number of times may indicate the working condition of the operators, and the updated second number of times may indicate the operation state of the transportation apparatus. In the present disclosure, the working efficiency of the operators and the operation efficiency of the transportation apparatus may be determined based on the working time period of the operators and the operation time period of the transportation apparatus, respectively. For specific applications, reference may be made to the following embodiment of the system, and is not described in detail herein.

In an embodiment, if it is determined that the target component is not carrying a transportation object by analyzing the acquired detection signal, the history information of the target component may be analyzed in the same way as described above. It is determined whether the transportation object carried by the target component is unloaded under a condition that the target component operates in the first transportation phase and reaches the target position. In a case of positive determination, the number of times for the transportation object is updated, and in a case of negative determination, the number of times for the transportation object remains unchanged.

In summary, when it is determined that the target component of the transportation apparatus is carrying a transportation object, a current movement state of the target component is further determined. The number of times for the transportation object is updated only when it is detected that the target component is in the first transportation phase and then the transportation object is no long carried by the target component, so that the accuracy in counting the transportation number for the transportation object is significantly improved, thereby improving reliability in analyzing the working efficiency of the operator and the operation state of the transportation apparatus.

Figure 5:
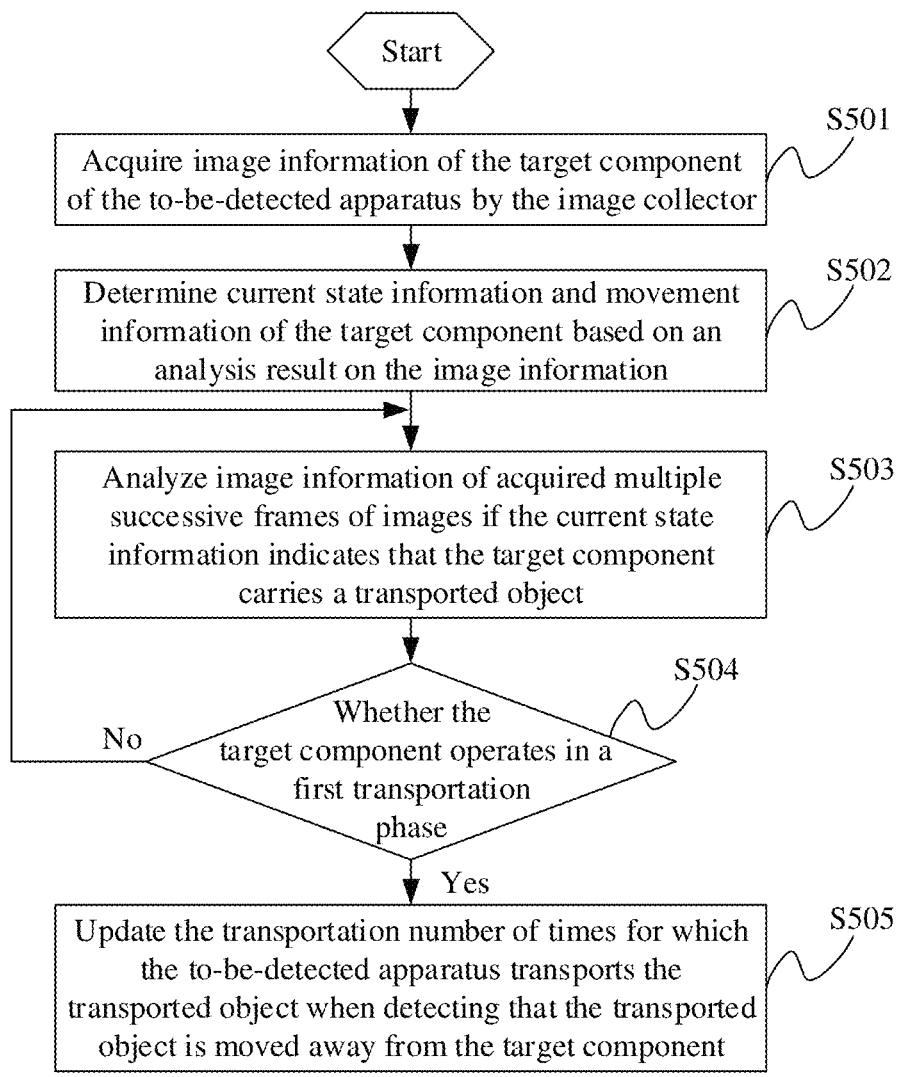
FIG. 5 is a flowchart of a data processing method according to another embodiment of the present disclosure.

Reference is made to FIG. 5, which is a flowchart of a data processing method according to another embodiment of the present disclosure. In this method, the target component of the transportation apparatus is detected by an image collector. The method may include the following steps S501 to S505.

In step S501, image information of the target component of the transportation apparatus is acquired by the image collector.

In this embodiment, image collection for the target component performed by the image collector may refer to the description of the corresponding part in the above embodiment with reference to FIG. 1, which is not repeated herein.

In step S502, a current state and movement information of the target component are determined based on an analysis of the image information.

The image processing algorithm used in a process of analyzing the image information is not specifically limited herein, which may be an image denoising algorithm, an image sharpening algorithm, an image edge detection algorithm, an image segmentation algorithm and the like.

The current state may indicate whether the target component is carrying a transportation object. The movement information may indicate what movement phase the target component is currently in, such as the ascending movement phase or the descending movement phase, reference may be made to the description of the corresponding part in the above embodiment.

In step S503, if the current state indicates that the target component is carrying a transportation object, multiple successive frames of the acquired image information is analyzed.

In this embodiment, a movement state of the target component may be determined by analyzing a position of the target component relative to a fixed component in multiple successive frames of the acquired the image information, but the present disclosure is not limited thereto.

In some certain scenarios, one frame of the acquired image information is analyzed, to determine the movement state of the target component based on an analysis result. A specific implementing process is similar to that described in this embodiment, and is not repeated herein. Therefore, when the current state indicates that the target component is carrying a transportation object, at least one frame of image information may be acquired, and analysis is performed on the at least one frame of image information.

In step S504, it is determined whether the target component operates in the first transportation phase based on an analysis result. If it is determined that the target component operates in the first transportation phase, the method proceeds to step S505. If it is determined that the target component does not operate in the first transportation phase, the method returns to step S503 to continuously analyze the acquired image information.

For the first transportation phase, reference may be made to the description of the corresponding part in the above embodiment, which is not repeated herein.

In step S505, if it is detected that the transportation object is no longer carried by the target component, the number of times that the transportation apparatus performs transport is updated.

It this embodiment, the time that the transportation object carried by the target component is no longer carried may be determined by analyzing the acquired image information. If it is determined that the transportation object is no longer carried by the target component, it is indicated that the transportation apparatus performs one transportation operation, and the number of times of transportation is added by one.

the manner of updating the number of times for the transportation object may be similar to that described in the above embodiments, which is not repeated herein.

In summary, in this embodiment, the target component is detected in real time by the image collector. When it is determined that the target component is carrying a transportation object, and if it is determined, by analyzing the image information of the target component acquired in real time, that the target component operates in the first transportation phase and then the transportation object is no longer carried by the target component, the number of times that the transportation apparatus performs transport is updated. It is unnecessary to refit the pressure pipeline of the transportation apparatus, thereby ensuring security in using the transportation apparatus.

Figure 6:
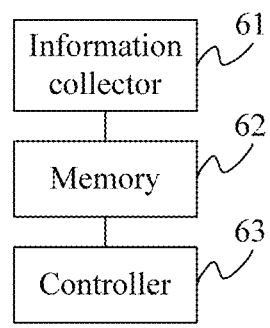
FIG. 6 is a structural diagram of a data processing device according to an embodiment of the present disclosure.

Reference is made to FIG. 6, which is a structural block diagram of a data processing device according to an embodiment of the present disclosure. The device may include an information collector 61, a memory 62 and a controller 63.

The information collector 61 is configured to collect a current state of a target component of a transportation apparatus.

The information collector 61 may include an image collector, an obstacle sensor, a position sensor and the like, which may be determined based on a manner for collecting state information of the target component.

Figure 7:
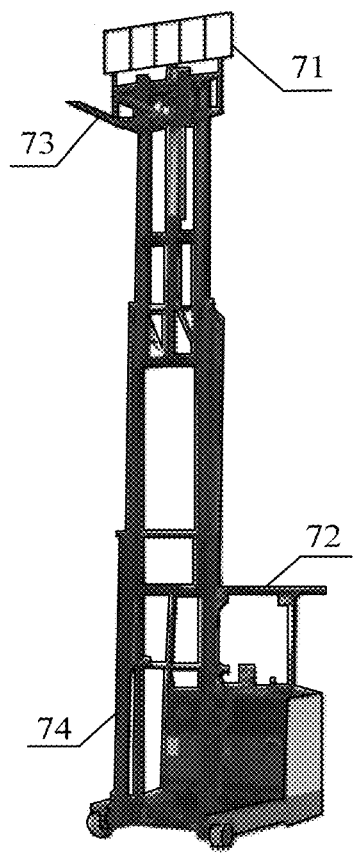
FIG. 7 is a schematic diagram showing an arrangement of an information collector in a transportation apparatus according to the present disclosure.

In the present disclosure, in combination with the description of the corresponding part in the above embodiment and referring to FIG. 7, which is a schematic diagram of the transportation apparatus, the target component is required to be located in the photographing range of the image collector. Since the target component is a part of the transportation apparatus, the image collector may be arranged on a top of the transportation apparatus. For example, the image collector is arranged on a load-backrest 71, a top of a cab of a vehicle, or an overhead guard 72, so that a pallet fork is within the photographing range of the image collector. However, the present disclosure is not limited thereto.

In this embodiment, the image collector is configured to collect image information of the target component of the transportation apparatus in real time.

Accordingly, the controller 63 may be configured to: determine the current state of the target component based on an analysis of the image information; and update, if the current state indicates that the target component is carrying a transportation object, the number of times of transporting the transportation object when it is determined that the transportation object is no longer carried by the target component based on an analysis of at least one frame of the image information.

In another embodiment of the present disclosure, the information collector 61 includes an obstacle sensor and a position sensor. In practice, the position sensor may be configured to detect whether the target component of the transportation apparatus is located at the predetermined position. The obstacle sensor may be configured to transmit a first signal to the target component, receive a second signal that is fed back from the target component, and generate a detection signal for the target component.

Accordingly, the controller 63 may be configured to: determine, based on an analysis of the detection signal, whether the target component is carrying a transportation object; and update, if it is determined that the target component is carrying a transportation object, the number of times that the transportation apparatus performs transport, when determining that the transportation object is no longer carried by the target component based on at least one acquired detection signal.

In this embodiment, still taking the vehicle shown in FIG. 7 as an example. The obstacle sensor may be arranged on the load-backrest 71, the overhead guard 72, or a pallet fork 73. The position sensor may be arranged on a mast 74, to avoid the pallet fork 72 from descending excessively to strike on the ground, resulting in an effect on the operation efficiency. It is to be noted that, arrangement positions of the image collector, the obstacle sensor and the position sensor may vary depending on different transportation apparatuses, which may be determined based on operation structure of the different transportation apparatus, and are not described in detail herein.

The device may further include an alarm. The alarm is configured to output, when the controller 63 determines that the target component currently reaches the predetermined position, a prompt message to prompt the operator to output a command for controlling the target component to move in reverse. Alternatively, when the controller 63 determines that the target component currently reaches the predetermined position, the target component is directly controlled to move in reverse without waiting for the operator to input a command, thereby improving the operation efficiency.

The alarm may be an indicating lamp, a display, a buzzer, a voice module or the like. The manner for outputting a prompt message varies depending on a structure of the alarm, which is not limited herein.

The memory 62 is configured to store history information of the target component and the number of times that the transportation apparatus performs transport.

The controller 63 is configured to: acquire the current state; update, if the current state indicates that the target component is carrying a transportation object, the number of times stored in the memory when it is detected that the transportation object is no longer carried by the target component; and acquire, if the current state indicates that the target component is not carrying a transportation object, the history information of the target component and update the number of times stored in the memory based on an analysis of the history information.

After acquiring the history information of the target component, the controller 63 is configured to: determine, based on the history information, whether the target component carried a transportation object in an adjacent first time period; and update the number of times that the transportation apparatus performs transport if it is determined that the target component carried a transportation object in the adjacent first time period.

If it is determined that the target component is carrying a transportation object, the controller 63 is further configured to calculate a time difference between a time that the target component is currently carrying the transportation object and a time that the target component previously carried the transportation object, so as to update the number of times that the transportation apparatus performs transport if it is determined that the time difference is greater than a time threshold and it is detected that the transportation object is no longer carried by the target component.

When it is required to obtain the working condition of an operator and the operation state of the transportation apparatus, a total number of times for the operator and a total number of times for the transportation apparatus are counted. In a process of updating the number of times for the transportation object, the controller 63 is configured to: acquire, when authentication information of an operator currently operating the transportation apparatus is determined, a first number of times that is stored in association with the authentication information and a second number of times that is stored in association with the transportation apparatus; and update the acquired first number of times and the acquired second number of times.

Figure 8:
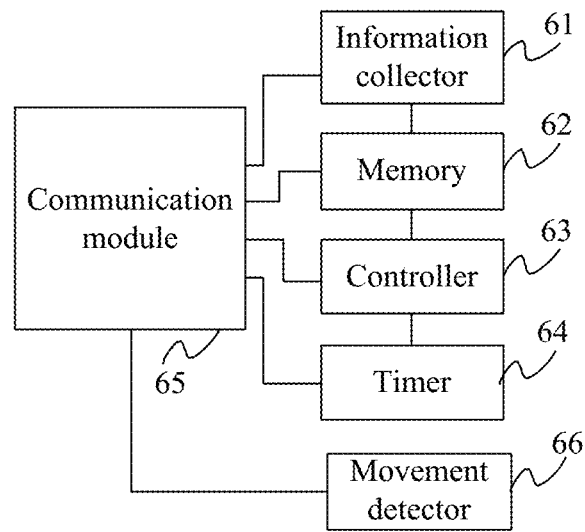
FIG. 8 is a structural diagram of a data processing device according to another embodiment of the present disclosure.

Referring to FIG. 8, the device may further include a timer 64. The timer 64 is configured to record a transportation time period and an operation time period of the transportation apparatus.

In this embodiment, if the controller 63 determines that the target component is carrying a transportation object, the timer 64 may be triggered to start timing until it is detected that the transportation object is no longer carried by the target component. The transportation time period of the transportation apparatus is updated based on the time period acquired by the timer 64, to acquire a total transportation time period of the transportation apparatus, so that the operation efficiency of the transportation apparatus can be calculated in combination with the acquired total number of times for the transportation apparatus.

A transportation time period for each type of transportation objects may be counted in this way, so as to calculate operation efficiency for each type of transportation objects. Alternatively, operation efficiency of different types of transportation apparatuses for transporting one type of transportation objects is counted. Parameters to be counted may be determined based on the actual demands, which are not described in detail herein.

Based on this, referring to FIG. 8, the data processing device may further include a communication module 65. The communication module 65 is configured to transmit the updated number of times that the transportation apparatus performs transport and the total transportation time period to a server.

In practice, the communication module 65 may transmit the acquired number of times and the total transportation time period to the server directly or via a terminal, which is not limited herein.

A component structure of the communication module 65 may vary depending on a communication manner between the data processing device and the terminal, the server. The structure of the communication module 65 is not limited herein, and the communication module 65 may be a wireless communication module or a wired communication module.

Referring to FIG. 8, the device may further include a movement detector 66. The movement detector 66 is configured to detect movement information of the target component.

The controller 63 is further configured to: determine, based on the movement information, whether the target component carrying the transportation object currently operates in a descending movement phase when the current state indicates that the target component is carrying a transportation object; and update the number of times that the transportation apparatus performs transport if it is detected that the transportation object is no longer carried by the target component.

It can be seen that, in this embodiment, the number of times that the transportation apparatus performs transport is counted with reference to the movement of the target component of the transportation apparatus, improving reliability of the acquired number of times.

In summary, in embodiments of the present disclosure, it is reliably determined whether the target component transports the transportation object by directly detecting a state of the target component of the transportation apparatus, and the number of times that the transportation apparatus performs transport is obtained. It is unnecessary to refit the pressure pipeline of the transportation apparatus in the whole process, thereby ensuring security in operating the transportation apparatus.

Figure 9:
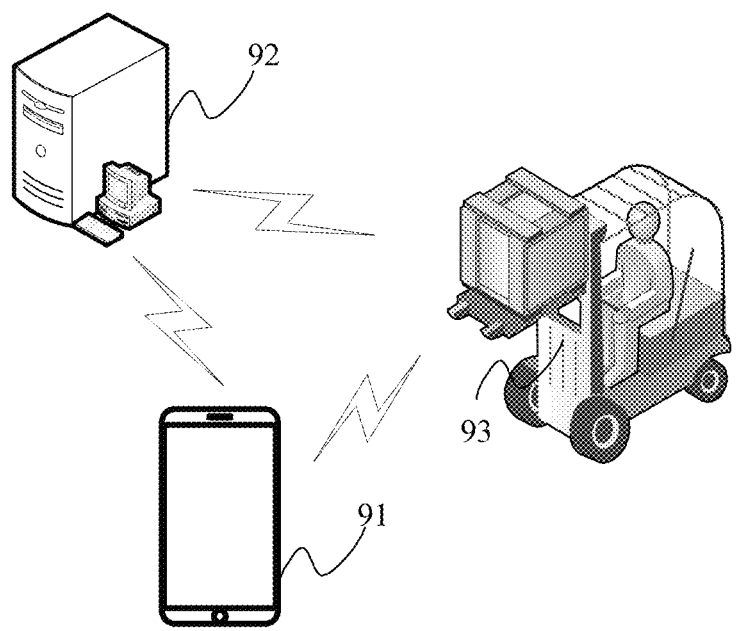
FIG. 9 is a structural diagram of a data processing system according to an embodiment of the present disclosure.

Reference is made to FIG. 9, which is a structural diagram of a data processing system according to an embodiment of the present disclosure. The system may include a terminal 91, a server 92 and a data processing device 93.

A structure and a function of the data processing device 93 may refer to that described in the embodiments of the above device, and are not described in detail herein. As shown in FIG. 9, the data processing device 93 is generally arranged in the transportation apparatus.

Further, the data processing device 93 may transmit the acquired total number of times that the transportation apparatus performs transport and the operation time period information of the transportation apparatus to the server via the communication module. The operation time period information may include the operation time period, standby time and shutdown time of the transportation apparatus associated with different user accounts.

The server 92 is configured to generate an operation report based on the total number of times that the transportation apparatus performs transport and the operation time period information.

The terminal 93 is configured to display the operation report.

The terminal 93 may be a device such as a cellphone, a computer or an industrial control computer. In practice, the operator may control the transportation apparatus and perform spot check on the transportation apparatus via the terminal. Further, data acquired by the transportation apparatus may be transmitted to the server via the terminal for storage, which is not limited herein.

Figure 10:
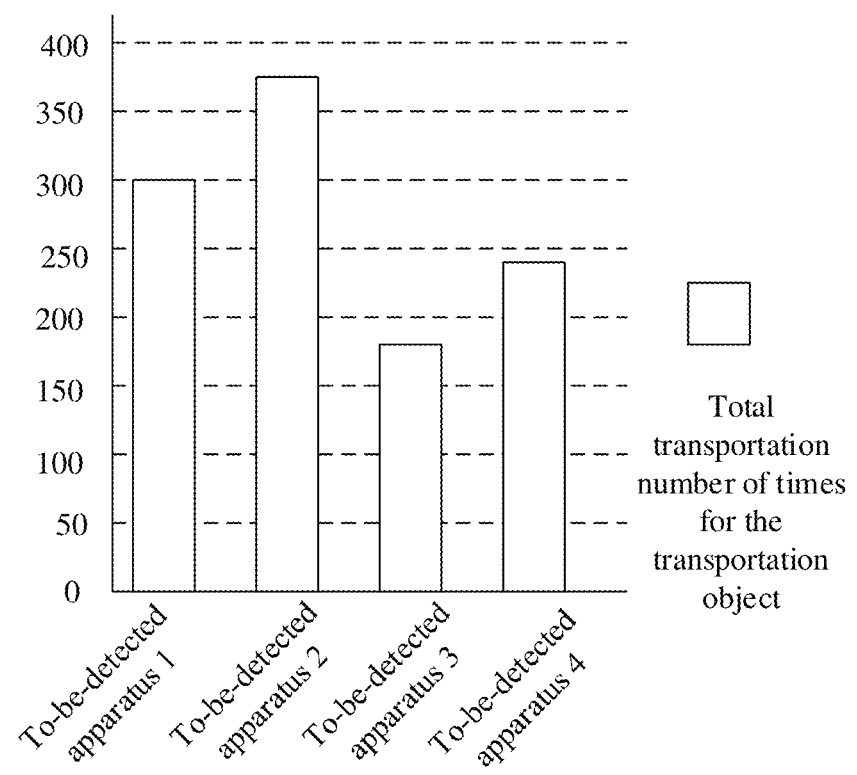
FIG. 10 shows a statistical histogram according to the present disclosure.
Figure 11:
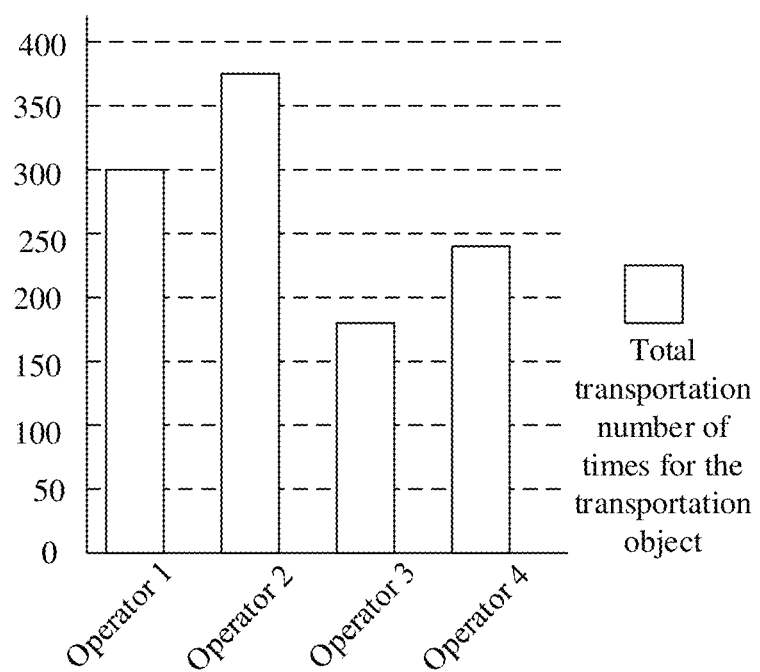
FIG. 11 shows another statistical histogram according to the present disclosure.

In the present disclosure, after receiving the data transmitted from the data processing device, the server may perform counting according to actual demands. For example, a total number of times that multiple transportation apparatuses transport the transportation object may be counted, and is represented by a histogram as shown in FIG. 10 for comparison, so that the operator can visually and rapidly obtain transportation conditions of the multiple transportation apparatuses. Similarly, a total number of times that multiple operators transport the transportation object by operating the transportation apparatuses may be counted and is represented by a histogram as shown in FIG. 11. However, an outputting manner and contents of the number of times are not limited to that shown in FIGS. 10 and 11, and are not described in detail herein.

Further, in this embodiment, an operation report may be generated based on the analysis result of the server. Contents and recording manner of the operation report are not limited herein, which may be determined according to actual demands.

After acquiring the operation report for the transportation object, the server may transmit the operation report to a terminal of a manager. After detecting a command of the manager for viewing the operation report, the terminal may directly display the operator, so that the manager can timely and accurately obtain the working condition of the operator and the operation state of the currently operated transportation apparatus.

It is to be noted that, a communication among the server, the terminal and the data processing device is not limited herein. As described above, the data acquired by the data processing device may be transmitted to the server directly or via the terminal. Similarly, information fed back by the server may be transmitted to a display of the data processing device directly or via the terminal for displaying, or the information fed back by the server may be directly transmitted to the terminal for displaying, which may be determined based on the actual demands.

In summary, in the present disclosure, the data processing device detects the target component of the transportation apparatus, and update the number of times that the transportation apparatus performs transport if it is determined that the target component is carrying a transportation object and then the transportation object is unloaded. If it is detected that the target component is not carrying a transportation object at the current time, the number of times that the transportation apparatus performs transport is updated based on an analysis of the history information of the target component, to obtain a total number of times that the transportation apparatus performs transport. The obtained total number of times is transmitted to the server together with information such as the operation time period and the transportation time period of the transportation apparatus, for the server to calculate the operation efficiency of the transportation apparatus. Further, the working efficiency of the operator operating the transportation apparatus may also be calculated, to facilitate the manager to schedule the transportation apparatuses and the operators based on a statistical result.

Finally, it should be noted that the relationship terminologies such as "first" and "second" are only used in the above embodiments to distinguish one module or operation from another, rather than necessitating or implying that the relationship or order actually exists between the modules or operations.

The embodiments in this specification are described in a progressive way, each of which emphasizes the differences from others, and the same or similar parts among the embodiments can be referred to each other. Since the device and the system disclosed in the embodiments correspond to the method therein and the system includes the device, the description thereof is relatively simple, and for relevant matters references may be made to the description of the method.

Embodiments of the disclosure are described above, so that those skilled in the art can implement or use the present disclosure. Various modifications to the embodiments are obvious to those skilled in the art, and general principles defined in this specification may be implemented in other embodiments without departing from the spirit or scope of the present disclosure. Therefore, the present disclosure is not limited to the embodiments described in this specification but accords with the widest scope that complies with the principles and novelty disclosed in this specification.

The invention claimed is:

1. A data processing method, comprising:
    acquiring a current state of a target component of a transportation apparatus, and determining whether the current state indicates that the target component is carrying a transportation object;
    if the current state indicates that the target component is carrying a transportation object,
    continuously detecting whether the transportation object is no longer carried by the target component; and updating a number of times that the transportation apparatus performs transport when the transportation object is detected as being no longer carried by the target component; and if the current state indicates that the target component is not carrying a transportation object, acquiring history information of the target component; and updating, based on an analysis of the history information, the number of times that the transportation apparatus performs transport.

2. The method according to claim 1, wherein if the current state indicates that the target component is carrying a transportation object, the method further comprises:

detecting movement information of the target component;

determining, based on the movement information, whether the target component is operating in a first transportation phase;

performing, if the target component is operating in the first transportation phase, the process of continuously detecting whether the transportation object is no longer carried by the target component and updating a number of times that the transportation apparatus performs transport when the transportation object is detected as being no longer carried by the target component; and returning to the process of detecting the movement information of the target component if the target component is not operating in the first transportation phase.

3. The method according to claim 1, wherein the updating, based on an analysis of the history information, the number of times that the transportation apparatus performs transport comprises:

determining whether the target component carried a transportation object during an adjacent time period; and updating the number of times that the transportation apparatus performs transport if the target component carried a transportation object during the adjacent time period.

4. The method according to claim 1, wherein if the current state indicates that the target component is carrying a transportation object, the method further comprises:

calculating a time difference between a time that the target component is currently carrying the transportation object and a time that the target component previously carried another transportation object, and wherein the updating a number of times that the transportation apparatus performs transport when detecting that the transportation object is no longer carried by the target component comprises:

updating the number of times that the transportation apparatus performs transport when detecting that the transportation object is no longer carried by the target component, if the time difference is greater than a time threshold.

5. The method according to claim 1, wherein the acquiring a current state of a target component of a transportation apparatus comprises:

acquiring image information of the target component of the transportation apparatus by an image collector; and determining the current state of the target component based on an analysis of a frame of the image information, and wherein the continuously detecting whether the transportation object is no longer carried by the target component comprises:

continuously detecting whether the transportation object is no longer carried by the target component based on an analysis of other frames of the image information.

6. The method according to claim 1, wherein the acquiring a current state of a target component of a transportation apparatus comprises:

acquiring a detection signal from an obstacle sensor, when detecting that the target component of the transportation apparatus is located at a predetermined position by a position sensor; and determining whether the target component is carrying a transportation object based on a frame of the detection signal, and wherein the continuously detecting whether the transportation object is no longer carried by the target component comprises:

continuously detecting whether the transportation object is no longer carried by the target component based on other frames of the detection signal from the obstacle sensor.

7. The method according to claim 2, further comprising:

determining whether the target component reaches a predetermined position by a position sensor; and if it is determined that the target component reaches the predetermined position, outputting a prompt message to prompt an operator to input a command for controlling the target component to move in reverse; or controlling the target component to move in reverse.

8. The method according to claim 1, wherein the updating the number of times that the transportation apparatus performs transport comprises:

receiving authentication information of an operator currently operating the transportation apparatus;

acquiring a first number of times that is stored in association with the authentication information, wherein the first number of times is a number of times that the operator performs transport;

acquiring a second number of time that is stored in association with the transportation apparatus, wherein the second number of times is a number of times that the transportation apparatus performs transport; and updating the first number of times and the second number of times.

9. The method according to claim 1, wherein if the current state indicates that the target component is carrying a transportation object, the method further comprises:

recording a time period that the transportation apparatus has transported the transportation object from picking up the transportation object until unloading the transportation object from the target component, to obtain a total transportation time period for the transportation apparatus; and transmitting the updated number of times that the transportation apparatus performs transport and the total transportation time period to a server.

10. A data processing device, comprising:

an information collector configured to collect a current state of a target component of a transportation apparatus;

a memory configured to store history information of the target component and the number of times that the transportation apparatus transports a transportation object; and a controller configured to: acquire the current state; and determine whether the current state indicates that the target component is carrying a transportation object; if the current state indicates that the target component is carrying a transportation object, continuously detect whether the transportation object is no longer carried by the target component, and updating a number of times that the transportation apparatus performs transport when the transportation object is detected as being no longer carried by the target component; and the current state indicates that the target component is not carrying a transportation object, acquiring the history information of the target component, and update, based on an analysis of the history information, the number of times that the transportation apparatus performs transport.

11. The device according to claim 10, further comprising:
a movement detector configured to detect movement information of the target component, wherein
if the current state indicates that the target component is carrying a transportation object, the controller is further configured to determine, based on the movement information, whether the target component is operating in a first transportation phase; and if the target component is operating in the first transportation phase, continuously detect whether the transportation object is no longer carried by the target component and update the number of times that the transportation apparatus performs transport when the transportation object is detected as being no longer carried by the target component.

12. The device according to claim 10, wherein the controller is further configured to: determine, based on an analysis of the history information, whether the target component carried the transportation object during an adjacent time period; and update the number of times that the transportation apparatus performs transport if the target component carried the transportation object during the adjacent time period.

13. The device according to claim 10, wherein the information collector is an image collector, the target component is arranged on the transportation apparatus and is located within a photographing range of the image collector, and wherein
the image collector is configured to collect image information of the target component of the transportation apparatus in real time, and
the controller is configured to: acquire the current state of the target component based on an analysis of a frame of the image information; and continuously detect whether the transportation object is no longer carried by the target component based on an analysis of other frames of the image information.

14. The device according to claim 10, wherein the information collector comprises an obstacle sensor and a position sensor, and wherein
the position sensor is configured to detect whether the target component of the transportation apparatus is located at a predetermined position,
the obstacle sensor is configured to transmit a first signal to the target component, receive a second signal fed back from the target component, and generate a detection signal for the target component, and
the controller is configured to determine whether the target component is carrying a transportation object based on a frame of the detection signal; and continuously detect whether that the transportation object is no longer carried by the target component based on other frames of the detection signal from the obstacle sensor.

15. A data processing system, comprising a terminal, a server, and a data processing device, wherein
the data processing device comprises:
an information collector configured to collect a current state of a target component of a transportation apparatus;
a memory configured to store history information of the target component and the number of times that the transportation apparatus transports a transportation object; and
a controller configured to: acquire the current state; and determine whether the current state indicates that the target component is carrying a transportation object; if the current state indicates that the target component is carrying a transportation object, continuously detect whether the transportation object is no longer carried by the target component, and update a number of times that the transportation apparatus performs transport when the transportation object is detected as being no longer carried by the target component; and the current state indicates that the target component is not carrying a transportation object, acquiring the history information of the target component, and update, based on an analysis of the history information, the number of times that the transportation apparatus performs transport.

* * * * *